United States Patent [19]
Raether

[11] Patent Number: 5,916,441
[45] Date of Patent: Jun. 29, 1999

[54] APPARATUS FOR DESALINATING SALT WATER

[75] Inventor: Roger J. Raether, Twin Brooks, S. Dak.

[73] Assignee: D'Sal International, Inc., Maple Plain, Minn.

[21] Appl. No.: 08/671,489

[22] Filed: Jun. 27, 1996

Related U.S. Application Data

[63] Continuation-in-part of application No. 08/558,953, Nov. 13, 1995, abandoned.

[51] Int. Cl.$^6$ .............................. B01D 63/00; B01D 61/00
[52] U.S. Cl. .................................. 210/257.2; 210/195.1; 210/641; 210/170; 210/136
[58] Field of Search .................. 210/652, 195.1, 210/257.2, 641, 170, 321.74, 321.6, 136

[56] References Cited

U.S. PATENT DOCUMENTS

| | | | |
|---|---|---|---|
| 3,060,119 | 10/1962 | Carpenter . | |
| 3,156,645 | 11/1964 | Chapin et al. | 210/120 |
| 3,171,808 | 3/1965 | Todd | 210/321 |
| 3,456,802 | 7/1969 | Cole | 210/170 |
| 3,536,454 | 10/1970 | Vuillemey . | |
| 3,567,030 | 3/1971 | Loeffler et al. | 210/321 |
| 3,906,250 | 9/1975 | Loeb . | |
| 3,978,344 | 8/1976 | Jellinek . | |
| 4,070,280 | 1/1978 | Bray | 210/652 |
| 4,125,463 | 11/1978 | Chenoweth . | |
| 4,161,445 | 7/1979 | Coillet . | |
| 4,169,789 | 10/1979 | Lerat . | |
| 4,293,419 | 10/1981 | Sekino et al. . | |
| 4,355,939 | 10/1982 | Pohl | 210/637 |
| 4,387,030 | 6/1983 | Sauder | 210/774 |
| 4,462,713 | 7/1984 | Zurcher et al. . | |
| 4,462,714 | 7/1984 | Smith et al. | 405/55 |
| 4,512,886 | 4/1985 | Hicks et al. | 210/170 |
| 4,645,599 | 2/1987 | Fredkin | 210/416.1 |
| 4,770,775 | 9/1988 | Lopez | 210/321.83 |
| 4,919,805 | 4/1990 | Johnson | 210/332 |
| 4,973,408 | 11/1990 | Keefer | 210/652 |
| 5,133,623 | 7/1992 | Gustafson . | |
| 5,186,822 | 2/1993 | Tzong et al. . | |
| 5,229,005 | 7/1993 | Fok et al. | 210/652 |
| 5,366,635 | 11/1994 | Watkins . | |
| 5,366,636 | 11/1994 | Watkins | 210/651 |
| 5,520,816 | 5/1996 | Kuepper | 210/652 |

FOREIGN PATENT DOCUMENTS

| | | |
|---|---|---|
| 77/0499 | 7/1978 | South Africa . |
| 8203308 | 7/1981 | Spain . |
| 1141138 | 1/1969 | United Kingdom . |
| 2068774 | 8/1981 | United Kingdom . |
| WO 96/31436 | 10/1996 | WIPO . |

OTHER PUBLICATIONS

M. Reali and H.W. Pohland, "Underground Reverse Osmosis Units for Sea Water Desalination", *IDA World Congress*, vol. VI, pp. 297–304; Nov. 18–24, 1995.

D. Goswami, V.K. Srivastava, M. S. Hanra, B. M. Misra, and H. K. Sadhukan, Design of a 1800 M$^3$ /Day Two Stage Seawater Reverse Osmosis Plant for Drinking Water Supply in Water Scarce Area:, *IDA World Congress*, vol. V, pp. 115–128.

Hebden, D., G.R. Botha and M. Redecker; "Energy Conservation in Sewater Reverse Osmosis"; *Proceedings of the Sixth International Symposium on Fresh Water From the Sea*; vol. 4, pp. 197–208.

"Sed de soluciones" (Thirsty of Solutions), *El Mundo*, vol. VII, No. 284, Apr. 9, 1995.

"The Osmotic Pump", Levenspiel and de Nevers, *Science*, vol. 183, No. 4121, Jan. 18, 1974.

*Primary Examiner*—Ana Fortuna
*Attorney, Agent, or Firm*—Merchant, Gould, Smith, Edell, Welter & Schmidt, P..A.

[57] ABSTRACT

A desalination system using hydrostatic pressure formed in a vertical mine shaft to function reverse osmosis membranes plumbed so that permeate water from the last membrane is input water to the next. The hydrostatic pressure forces the brine water from the first membrane nearly to the earth's surface. The second brine water is likely usable as drinking water. The final product water is pure enough to be agriculturally usable.

6 Claims, 4 Drawing Sheets

APPARATUS FOR DESALINATING SALT WATER

This application is a CIP of application Ser. No. 08/558,953, filed Nov. 13, 1995, now abandoned.

FIELD OF THE INVENTION

The present invention is a pioneering invention which is directed to reverse osmosis desalination apparatus and, more particularly, to apparatus using a gravitational pressure head to operate reverse osmosis elements. The product water can be used for drinking, and also for agriculture.

BACKGROUND OF THE INVENTION

Over the last few decades desalination technologies have been used increasingly throughout the world to produce drinking water from brackish groundwater and seawater. In the early 1950's there were about 225 land-based desalination plants worldwide, and in the mid-1990's, there are over 4000. Nevertheless, in many areas of the world, even next to oceans, useable water remains in short supply. This is particularly true for agricultural use. The problem is that desalination is still expensive, and consequently, large quantities of desalinated water are cost prohibitive and are not available. The present invention is directed to creating large quantities of agriculturally-useable, desalinated water at a competitively affordable cost.

The present invention uses reverse osmosis technology. Conventional reverse osmosis systems require pumps to create operational pressures. Reverse osmosis membranes are housed in pressure containers in order to receive the incoming pressurized water. Operational electrical cost for the pumps becomes a key factor in ultimate water cost. Because the cost of creating the pressure is so significant, conventional systems connect multiple reverse osmosis elements in series so that brine water from the last element flows as input to the next element. Although any pressure drop across an element is minimal, salt concentration increases because some of the original water has permeated through the last element as product water. As salt concentration for downstream elements due to precipitation of salts increases, scaling of the elements increases. Over time, this results in frequent maintenance, that is, cleaning of elements or replacement of elements. Because maintenance cost becomes significant, water pretreatment is done to try to reduce fouling and scaling. The problem, however, is that the cost of pretreatment materials becomes high. All these costs (electrical, maintenance, pretreatment, element replacement) add together to make the ultimate cost of the desalinated water high.

Although, as indicated, conventional reverse osmosis technology is used to provide drinking water in locations that can afford it, costs as a result of the above factors are prohibitive for obtaining higher quantity and higher quality agriculturally-useable water. In this regard, it is noted that agriculturally-useable water must be purer than drinking water. This is true since any salt remaining in the water accumulates on land. That is, after a few years of irrigation of fertile land with water which is acceptable for drinking but which nevertheless has some salt content remaining, the once fertile land will become so alkaline that it no longer will support crops and will become arid. Thus, as indicated, there remains a tremendous need for desalinated, agriculturally-pure water that is available in adequate quantities at affordable prices.

To reduce the need for operational electricity, the present invention uses gravity to create operational pressures. Others have conceptualized the use of gravity. The apparatus disclosed in UK patent application GB2,068,774 is of most interest. In it, gravity is used to provide hydrostatic pressure as operational pressure for reverse osmosis elements located in a subterranean cavity. The brine waste water is forced most of the way back to the surface by the hydrostatic pressure. The drinking water is pumped to the surface. This disclosure does not understand, however, the need for and, consequently, does not address desalination to obtain agriculturally-useable water.

SUMMARY OF THE INVENTION

The present invention is a pioneering invention which is directed to apparatus for desalinating salt water for agricultural usage. The apparatus includes first and second reverse osmosis membrane. A hydrostatic pressure head is gravitationally created as indicated. The apparatus includes first, second and third vertically-oriented mine shafts formed in the earth and extending downwardly from the surface of the earth. There is a first cross-shaft in the earth between the first and second vertically-oriented mine shafts and a second cross-shaft in the earth between the second and third vertically-oriented mine shaft. A reverse osmosis element having a reverse osmosis membrane therein is used to separate salt water into permeate water and brine water. The first vertically-oriented mine shaft contains salt water so that a hydrostatic pressure is created sufficient for separating the permeate water from the salt water with the reverse osmosis membrane. The second vertically-oriented mine shaft is open to atmosphere and provides physical access for a human operator from the surface of the earth to the reverse osmosis element. The third vertically-oriented mine shaft contains brine water. There is mechanism for moving the salt water from a source to the first vertically-oriented mine shaft. There is means for fluidly communicating the salt water from the first vertically-oriented mine shaft through the first cross-shaft to the reverse osmosis element. There is mechanism for fluidly communicating the brine water from the reverse osmosis element through the second cross-shaft to the third vertically-oriented mine shaft. There is mechanism for directing the brine water from the third vertically-oriented mine shaft back to the source or other disposal location. In addition, there is mechanism for removing the permeate water from the reverse osmosis element for storage or use.

In one embodiment there is a first check valve or other water closure safety mechanism in the first mechanism for fluidly communicating salt water from the first vertically oriented mine shaft to the reverse osmosis element. There is also a second check valve or other water closure safety mechanism in the second mechanism for fluidly communicating the brine water from the reverse osmosis element to the third vertically-oriented mine shaft. In this way, the first and second check valves protect a human operator when servicing the reverse osmosis element from salt water in the first vertically-oriented mine shaft and from brine water in the third vertically-oriented mine shaft due to any failure in either of the first and second fluid communicating mechanisms.

In another embodiment, the salt water flows past the first membrane to create permeate water and first brine water. The permeate water is at a second pressure head which is less than the first hydrostatic pressure head and is greater than atmospheric pressure. The apparatus further includes mechanism for directing flow of the permeate water past the second reverse osmosis membrane to create second brine water and agriculturally useable water. The directing mechanism includes mechanism for maintaining the second pressure head within a range at the second membrane wherein agriculturally useable water is obtained.

The present invention is particularly advantageous since it combines mining technology (one or more vertical mine shafts) with desalination technology to achieve a high quantity of high quality agriculturally-useable water. Although an apparatus in accordance with the invention can be constructed using a single vertically-oriented shaft in the earth, in most embodiments herein it is described with respect to multiple vertically-oriented mine shafts.

To obtain the advantage of product water which is useable for both drinking and agriculture, first vertically-oriented mine shaft is formed sufficiently deep in the ground so that a hydrostatic pressure is obtained which is of a level not only sufficient to operate a first reverse osmosis membrane, but also a second one where the permeate water of the first is input to the second. In this way, it is the initially formed depth of the first mine shaft which results in the necessary hydrostatic first pressure head. Then, rather than being used as input water for downstream reverse osmosis elements as in conventional systems, the first brine water from the first reverse osmosis element is directed to a second vertical mine shaft where the first pressure head also functions to force the first brine water toward the earth's surface for return to the source or other destination.

In cavernous formations between the first and second mine shafts, the two reverse osmosis elements are connected in a way which is self-compensating with respect to the first pressure head available. In this regard, fresh water will permeate through a reverse osmosis membrane when the osmotic pressure plus a net driving pressure are applied. In the case of ocean water (around 35,000 parts per million (ppm) dissolved solids), it may take, for example, 800 psi. If the first mine shaft is formed to a depth of about 3000 feet for the purpose of creating a pressure head of about 1,200 psi, then the permeate water will have a pressure of about 400 psi (or whatever the difference is between the hydrostatic head pressure at the bottom of the first mine shaft and the osmotic pressure plus the net driving pressure to the first element). Since most of the dissolved solids are removed in the permeate water so that only perhaps, for example, 500 ppm remain, a brackish water type reverse osmosis membrane can be used as the second reverse osmosis element. A brackish water type element has a lower osmotic pressure level than a seawater element so that it will be operational at, for example, 400 psi. Thus, the permeate water is filtered once by the first element and again by the second element; the filtration being accomplished all as a result of having a sufficiently deep first mine shaft resulting in the necessary total hydrostatic pressure.

As earlier indicated, the first brine water from the first element is forced up a second mine shaft almost to the surface of the earth (just like water in a U tube seeking the same level in both legs) so it can be directed back to the ocean or other destination. The first brine water does not reach the surface because it has a greater density (perhaps 42,000 ppm) than the source sea water so it is heavier. A pump therefore is needed to lift the first brine water the remaining distance for directing to the ocean or otherwise.

If allowed to do so, the second brine water from the second reverse osmosis element will also seek an elevational level. It will rise to a level equivalent to a second pressure head, namely, approximately that of the permeate water from the first element. However, since the second brine water may have a level of dissolved solids which is acceptable for human drinking, in one embodiment of the invention, the second brine water is accumulated in a first reservoir and then pumped to the surface for use as drinking water. In an alternative embodiment, the second brine water is pumped from the water column of second brine water and is directed back to the ocean or other destination. It is noted that it is necessary to maintain the second brine water pressure head by the indicated water column or by a restriction between the second element and the first reservoir so that the second pressure head is sufficient (the 400 psi) to function the second element.

The agriculturally-pure water (permeate from the second element) is accumulated in a second reservoir and pumped to the surface. It likely has a salt content of less than 50 ppm, and probably less than 10 ppm.

Thus, whereas all of the source salt water in conventional systems must be pressurized by an electrical pump, in the present system there is only pumping of the first brine water due to a small difference in pressure head between the input salt water and the first brine water. Thus, electrical pumping costs related to the largest amount of water to go through the system is very minimal compared to conventional systems. Perhaps 30% of the input salt water will become permeate water. The permeate water is processed by the second reverse osmosis element. Although as much as 400 psi may be available to force second brine water toward the earth's surface, the second brine water will be pumped the remaining distance. Additionally, the final product water or agriculturally useable water will be pumped the entire elevational distance (approximately 3,000 feet) to the surface. In any case, because of the approximately 70% of the input salt water (now brine water) being naturally forced toward the earth's surface, more than half and perhaps as much as two-thirds of the electrical operational pumping costs will be saved with the inventive system as compared to conventional systems.

Since the electrical operational cost is much less with the present system, it is not necessary to direct brine water from upstream reverse osmosis elements to downstream reverse osmosis elements in order to extract as much permeate water as possible from the elements while the input salt water is at the pump-created high pressure. Consequently, input salt water can be flowed past the first reverse osmosis element at a higher speed than is common with conventional reverse osmosis systems. As a result, there will be less scaling or precipitation of salts onto the reverse osmosis membranes. Consequently, there will be less maintenance and less need for replacement of elements. Furthermore, because of this, there will be less need for certain kinds of pretreatment. Thus, there will be much less cost with the inventive system compared to conventional systems in the various categories of cost, namely, electricity for operation, reverse osmosis element maintenance, pretreatment, and element replacement.

A further substantial benefit is possible on use of the present inventive system. With conventional systems, the reverse osmosis membrane must be contained within a pressure container so that the membrane functions properly as the pressurized water is forced therethrough. With the present inventive system, a pressure container is not needed to give support to the reverse osmosis membrane. Rather, an appropriate housing is formed in the earth such that the reverse osmosis membrane is contained with the earth-supported housing.

Thus, the present system uses known reverse osmosis membranes, but does not require pressurizing pumps.

Rather, the present system achieves necessary head pressure using gravity. As a result, system design is radically different from conventional reverse osmosis systems, and substantial cost and water quality and quantity benefits are achieved.

DETAILED DESCRIPTION OF THE PREFERRED EMBODIMENT

Figure 1:
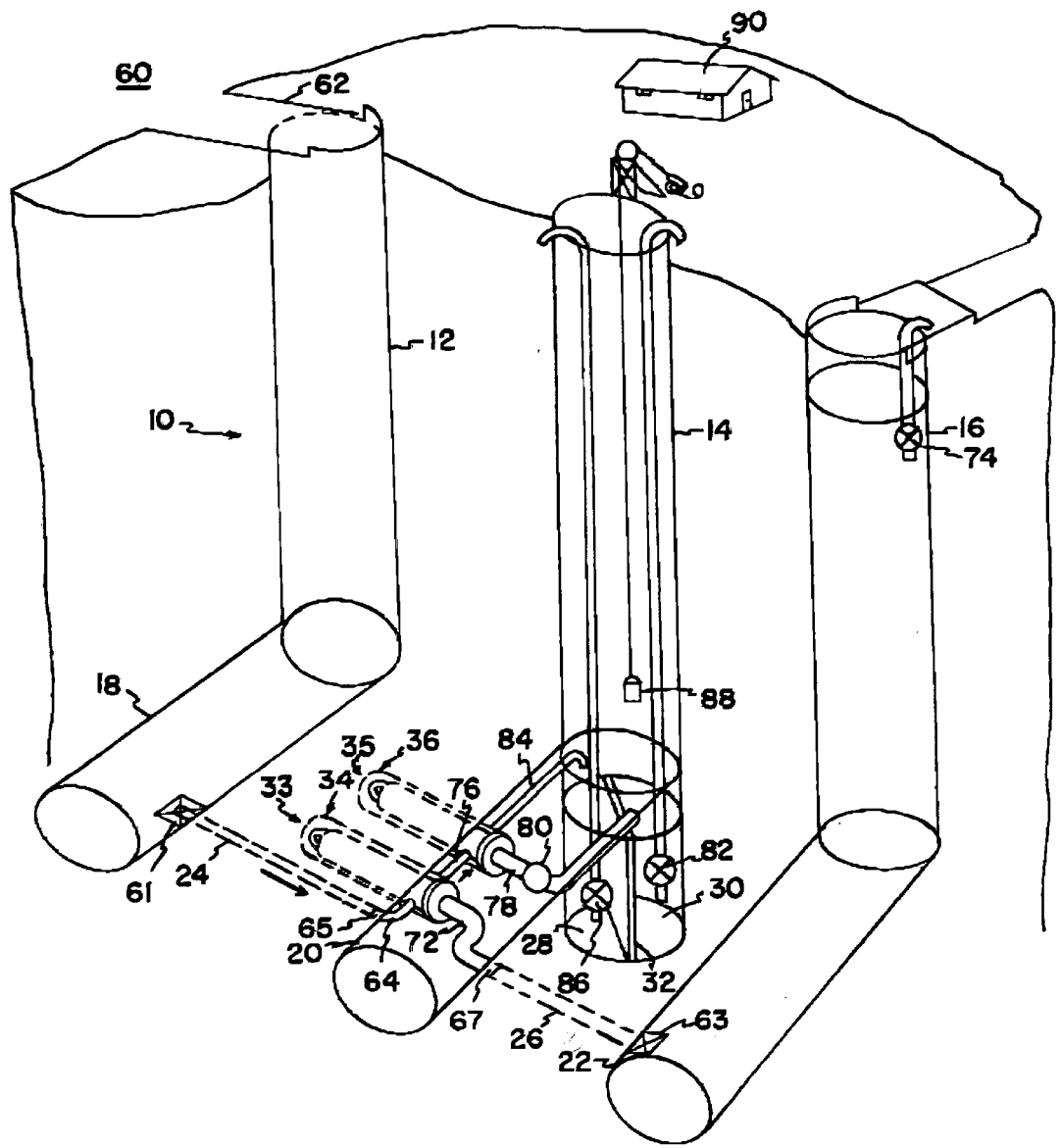
FIG. 1 is a perspective illustration of apparatus in accordance with the present invention.

A preferred embodiment of the present invention is disclosed in the accompanying drawings in which like parts are designated by the same numerals throughout the several drawings. With reference to FIG. 1, apparatus in accordance with the present invention is designated generally by the numeral 10. Apparatus 10 includes first, second, and third vertically-oriented mine shafts 12, 14, 16, respectively, formed in the earth and extending downwardly from the earth's surface. Although not necessarily needed, near the lower end of each vertically-oriented mine shaft, first, second, third substantially horizontal shafts 18, 20, 22, respectively may be formed as extensions of the vertically-oriented shafts. Alternatively, in some embodiments of the present invention, only a single shaft is needed in conjunction with suitable plumbing as will be recognized by those skilled in the art. Although it is preferable that mine shafts 12, 14, 16 and the extensions thereof, namely, shafts 18, 20, 22 be constructed using conventional mining technology well known to those so skilled, it is not necessary for the present invention. It is only necessary for shafts 12, 14, 16 to be holes or passages formed downwardly from the earth's surface in a generally vertically-oriented fashion. They simply need to provide containment for columns of water for reasons explained herein.

A tubular passage 24 (and likely a plurality of such passages) in the form of a first cross-shaft extends between first and second horizontal shafts 18, 20, and a second tubular passage 26 (again, likely a plurality of such passages) in the form of a second cross-shaft extends between second and third horizontal shafts 20, 22. Second vertically oriented shaft 14 can extend lower than second horizontal shaft 20 so as to form one or more reservoirs, such as first and second reservoirs 28, 30 on either side of separating wall 32. Only one reservoir is needed if only one stage of reverse osmosis filtration is done. First and second reservoirs 28, 30 could also be formed at other locations relative to second vertically oriented shaft 14 and second horizontal shaft 20, although it is preferable that at least first reservoir 28 for the agriculturally useable water be located elevationally beneath the reverse osmosis membranes.

Figure 2:
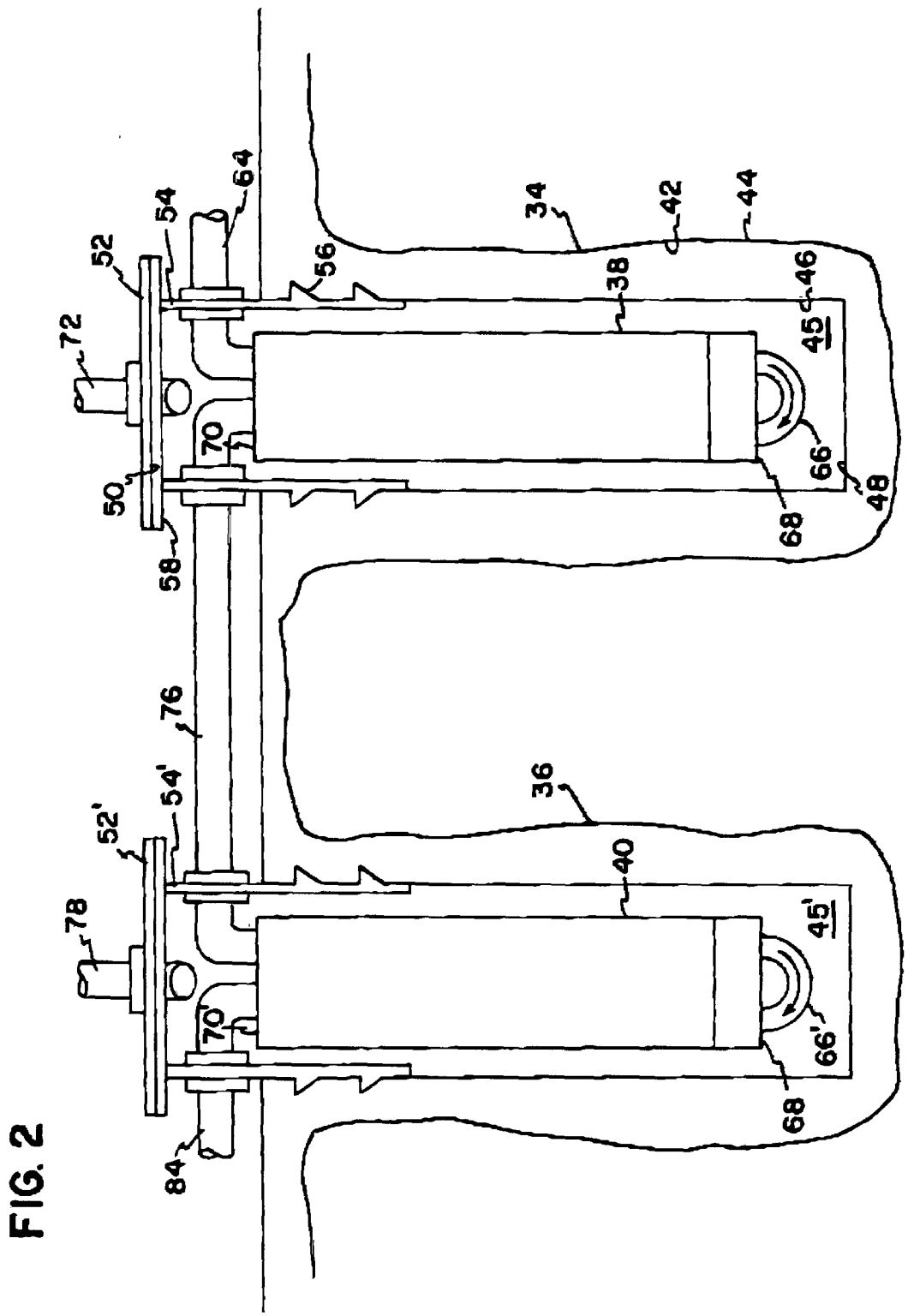
FIG. 2 is a cross-sectional view of a reverse osmosis membrane in an earth-supported housing.

With reference to FIGS. 1 and 2, reverse osmosis elements 33, 35 comprise first and second housings 34, 36, respectively, which contain first and second reverse osmosis membranes 38, 40, respectively, and associated internal plumbing. Housings 34 and 36 are the same. Also, although only one of each of first and second reverse osmosis membranes 38, 40 and housings 34, 36 are shown and discussed, it is understood that any number of such membranes 38 and housings 34 can be plumbed and formed with common input and outputs and that any such membranes 40 and housings 36 can also be plumbed and formed with common input and outputs. Furthermore, only housing 34 and associated reverse osmosis membrane 38 is needed if only one stage of reverse osmosis filtration is done.

Considering housing 34 as representative, housing 34 is at least partially contained within a boring formed as an appropriately sized passage 42 in the earth extending from second horizontal shaft 20. In accordance with conventional mining techniques, passage 42 can be packed with mud or otherwise prepared for an appropriate lining 44 formed from materials such as concrete, which lining 44 then becomes a part of housing 34. The resulting cavity preferably has a side 46 which is cylindrical and extends to end 48. The opposite end 50 of cavity 45 is formed with a bulkhead 52 and a liner 54 or equivalent structure. Liner 54 having fastening elements 56 extending into the material of lining 44 provides structure for bulkhead 52. Bulkhead 52 is fastened with bolts or other conventional fastening mechanism to a flange 58 formed at the end of liner 54. Since the interior of second vertical shaft 14 and second horizontal shaft 20 are at atmospheric pressure, liner 54 must be adequately anchored to material 44 and bulkhead 52 must be adequately fastened and sealed to flange 58 to provide an openable end for housing 34, wherein housing 34 also serves as a pressure vessel containing reverse osmosis membrane 38.

First reverse osmosis membrane 38 is formed to be a seawater functional element. An appropriate element can be obtained as Model No. 8040-HSY-SWC1 with a non-pressure container about the membrane from Hydranautics, Inc., 401 Jones Road, Oceanside, Calif. 92054. Second reverse osmosis membrane 40 is formed as a brackish water functional element. An appropriate element can be obtained from Hydranautics as Model No. 8040-LHY-CPA2 with a non-pressure container about the membrane. Both elements are constructed with the membranes being spiral wrapped.

With further reference to FIGS. 1 and 2, in use, salt water from an ocean 60 or other seawater source is pumped or otherwise directed to form a stream 62 from source 60 to vertically oriented shaft 12. The salt water fills first vertically oriented shaft 12 and first horizontal shaft 18 so that there is sufficient hydrostatic head pressure at the elevational level of first horizontal shaft 18 in order to function first and second reverse osmosis membranes 38 and 40 (or only first reverse osmosis membrane 38 is only one stage of reverse osmosis filtration is done). A representative vertical height between the surface of the earth as a first elevational level and first horizontal shaft 18 as a second elevational level is 3,000 feet (2000 feet if only one stage of reverse osmosis filtration is done). The first hydrostatic pressure head for such vertical height is about 1200 psi (800 psi if only one stage of reverse osmosis filtration is done). Other elevational heights resulting in other pressure heads can be used as long as a sufficient pressure head is developed to function first and second reverse osmosis membranes 38 and 40 (or just first reverse osmosis membrane 38 if only first stage reverse osmosis filtration is done). Salt water flows from first horizontal shaft 18 through passage 24. In this regard, the various vertical and horizontal mine shafts and passages are formed in accordance with conventional mining techniques or other like means and can have concrete casings similar to housings 34 and 36 or can have metallic or synthetic linings using materials known to those skilled in the art. The ends of passages 24 and 26 opening into second horizontal shaft 20 can be formed the same as housing 34 wherein liner 54 is anchored to material 44 and a bulkhead 52 is fastened to a flange 58 attached to liner 54. With such structure, appropriate pipe fittings can be fastened through the bulkhead or through bosses on the cylindrical liner as known to those skilled in the art. That is, it is understood that conventional plumbing parts are used herein. In this way, pipe 64 extends from communication with passage 24 to appropriately connect through liner 54 (or bulkhead 52). Pipe 64, since it is located within second horizontal shaft 20 which is at atmospheric pressure, must be a pressure pipe.

Preferably, a check valve 61 (or other safety mechanism for preventing flooding of second horizontal shaft 20 in case of a plumbing failure) is located at the entrance to passage 24 at the wall of horizontal shaft 18. Similarly, a check valve 63 (or other safety mechanism for preventing flooding of second horizontal shaft 20 in case of a plumbing failure) is located at the downstream end of passage 26 at the wall of horizontal shaft 22. In addition, preferably, a shutoff valve 65 is installed in pipe 64, and also a shutoff valve 67 is installed in pipe 72. Check valve 61 is normally open, but functions to close if there is a rapidly change of flow rate of salt water from horizontal shaft 18 into passage 24 which might signal a failure in the plumbing downstream from check valve 61. In this way, check valve 61 serves to prevent an excessive amount of salt water from rapid flowing into horizontal shaft 20. Check valve 63 functions to close if brine water in horizontal shaft 22 were to reverse direction and flow from horizontal shaft 22 into pipe 26. In this way, check valves 61 and 63 protect any human operators in horizontal shaft 20 and the associated vertically-oriented shaft 14 from failures in plumbing. Shutoff valve 65 provides a mechanism for controllably restarting apparatus 10. That is, water can be pumped into shaft 24 between check valve 61 and shutoff valve 65 using an external system (not shown). When the pressure in passage 24 has increased to equalize with the pressure in horizontal shaft 18, check valve 61 will open. Shutoff valve 65 can then be controllably opened to gradually fill the system down stream to shut valve 67. At that point, shutoff valve 67 can be controllably opened so that pressure in passage 26 can build to equalize with pressure in horizontal shaft 22. At that time, check valve 63 will open and apparatus 10 will again function normally.

Interior to cavity 45, pipe 66 in communication with pipe 64 extends the length of membrane 38 in order to provide input water to end 68 of membrane 38. Input salt water at the level of the first pressure head flows from end 68 to opposite end 70 of membrane 38. The brine water which exits end 70 fills cavity 45 so that there is very little difference in pressure between the input salt water from pipe 66 and the first brine water which fills cavity 45. Consequently, membrane 38 need not be contained in a pressure vessel within housing 34, and pipe 66 need not be a pressurized pipe.

The first brine water exits cavity 45 to flow in tube 72 which extends through bulkhead 52 and is in fluid communication with passage 26. The first brine water fills third horizontal shaft 22 and most of third vertical shaft 16 until a balancing equilibrium pressure is achieved. The third elevational level which is reached by first brine water as a result of the first pressure head is somewhat lower than the first elevational level where salt water entered first vertical shaft 12. This is true because the first brine water has a greater salt concentration than the input salt water and is, consequently, more dense. As a result, a pump 74 and necessary plumbing is used to move first brine water back to the ocean 60 or other destination.

Permeate or product water which results from filtration through the first reverse osmosis membrane 38, if only drinking water is desired so that only first stage reverse osmosis filtration is done, is directed from membrane 38 to reservoir 30. If agricultural water is desired, permeate or product water which results from filtration through the first reverse osmosis membrane 38 is directed from membrane 38 via pipe 76 extending through liner 54 (or bulkhead 52) to liner 54'. The prime numerals identify similar components throughout the drawings. Pipe 66' is in communication with pipe 76 and extends the length of membrane 40 to provide input permeate water to end 68' of membrane 40. In the same fashion as with membrane 38, the input water flows from end 68' to end 70' of membrane 40. The second brine water exits at end 70' and fills cavity 45'. Second brine water flows from cavity 45' at tube 78 which extends through bulkhead 52' and directs water to second reservoir 30.

If 1200 psi is developed as the hydrostatic pressure head as a result of the elevational depth of vertically oriented mine shaft 12, and if 800 psi is appropriate as a representative value to function first reverse osmosis element 38, then the pressure still available and which forms the pressure head of the permeate input water to second reverse osmosis membrane 40 is 400 psi. The second brine water has a pressure only a few psi less depending on restrictions to flow from one end of membrane 40 to the other. Since second vertically oriented shaft 14 is at atmospheric pressure so that first and second reservoirs 28 and 30 are at atmospheric pressure, then it is necessary that a restriction, such as relief valve 80 be located in pipe 78 to regulate the second pressure head and maintain it at the appropriate functioning level for membrane 40. Pipe 78 between bulkhead 52' and relief valve 80 is a pressure pipe. It is also possible not to use relief valve 80 and simply allow the second pressure head to force second brine water to an appropriate elevational height in pipe 78 as it is directed toward the first elevational level of the earth's surface thereby essentially forming one of reservoirs 28, 30. In either case, a pump 82 and appropriate plumbing materials known to those skilled in the art are used to lift the second brine water the rest of the necessary height to the earth's surface. Depending on the salt content in the second brine water, it may be used as drinking water, or it can be returned to the ocean or other appropriate destination.

Agriculturally useable water is obtained as the product water from membrane 40. The agriculturally useable water flows in pipe 84, a non-pressure pipe, through liner 54' (or bulkhead 52') to first reservoir 28. The agriculturally useable water is then pumped with pump 86 and appropriate known materials to the earth's surface for use.

It is noted that an elevator 88, electrical service, etc., can be provided for appropriate servicing of various components in second horizontal shaft 20. A building 90 can provide an appropriate covering facility for vertical shaft 14.

Figure 3:
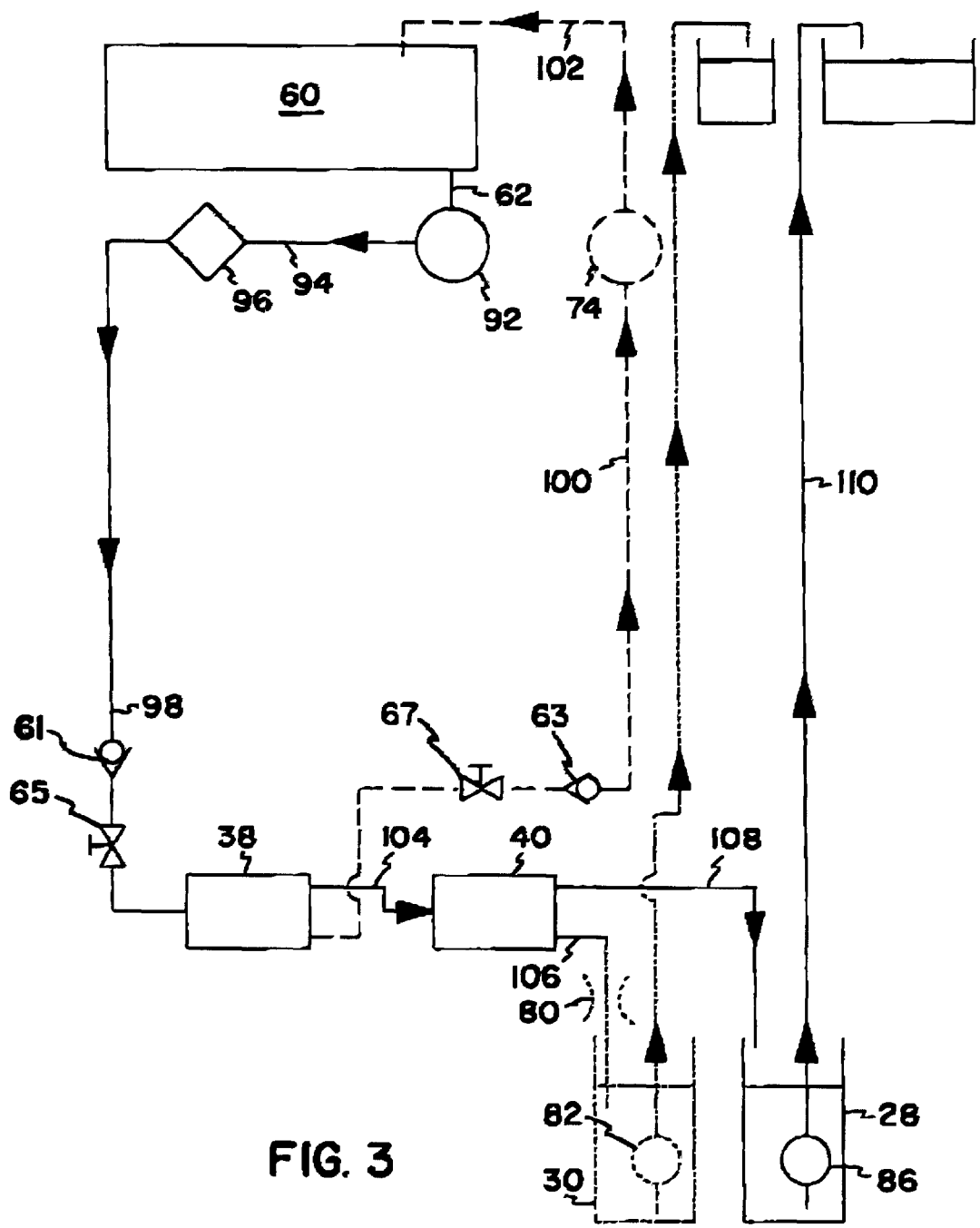
FIG. 3 is a flow diagram of the plumbing for apparatus in accordance with the present invention.

With reference to FIG. 3, a flow diagram is provided for apparatus 10. Salt water from source 60 is moved via line 62 with a pump 92 through line 94 and prefilter 96. Prefilter 96 is intended to remove larger animal life and particulate matter. Prefiltration helps reduce fouling of the reverse osmosis membranes. From filter 96, water is directed via line 98 (shaft 12) through check valve 61 and shutoff valve 65 to first membrane 38. First brine water exits membrane 38 and after flowing through shutoff valve 67 and check valve 63 and is forced up line 100 (shaft 16) with pump 74 providing necessary additional lift to move first brine water via line 102 back to source 60. Permeate water flows from first membrane 38 through line 104 to second membrane 40 (or, directly to reservoir 30 if only first stage reverse osmosis filtration is needed). Second brine water flows from membrane 40 through relief valve 80 to second reservoir via line 106. The second brine water is pumped with pump 82 to the surface for use as drinking water, if appropriate, or source 60 or other appropriate destination.

Agriculturally usable water flows from second membrane 40 via line 108 to first reservoir 28. The agriculturally usable water is pumped from first reservoir 28 with pump 86 via line 110 for use.

Figure 4:
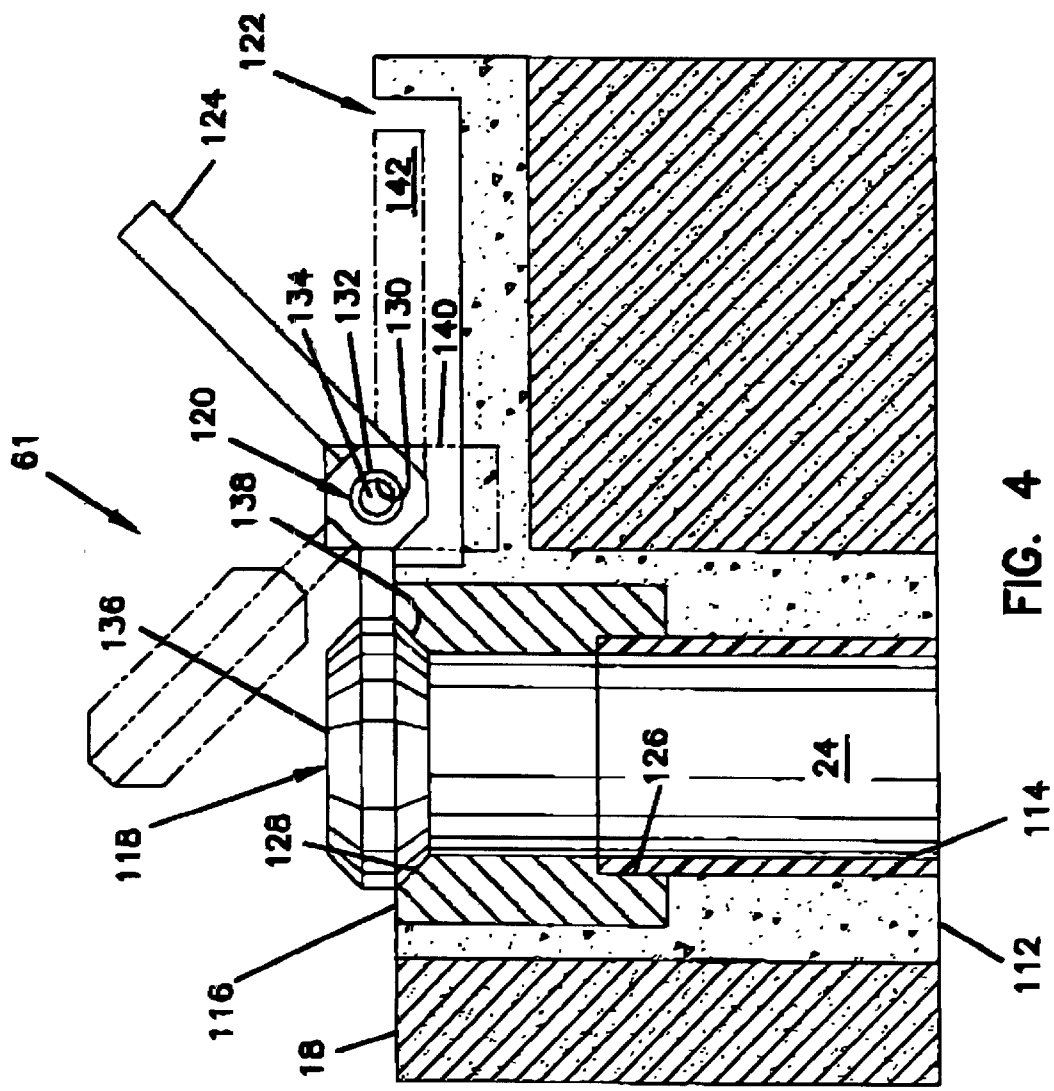
FIG. 4 is a side-cross-sectional view of a check valve for use in accordance with the present invention.

Check valves 61 and 63 can be identical. A representative check valve 61 is shown in FIG. 4. Check valve 61 is installed at the wall of horizontal shaft 18 at the entrance to passage 24. Passage 24, for example, can be lined with concrete 112 and a plastic tubing 114. Check valve 61 is appropriately set into concrete 112. Check valve 61 includes valve seat 116, counterbalance valve 118, a pivot assembly 120, and receiving housing 122 for the counterbalance portion 124 of counterbalance valve 118. Valve seat 116 is cylindrical and is set into concrete 112. Plastic tube 114 snugly fits into a groove 126 in the inside diameter of the downstream end of valve seat 116. A tapered seat surface 128 is formed at the inside diameter of the upstream end of valve seat 116. Counterbalance valve 118 pivots about pivot assembly 120 and consequently, includes a cylindrical passage 130 with a bushing 132 therein for receiving pin 134. Passage 130 is located at the apex of counterbalance portion 124 and valve portion 136, which are in an obtuse angle relationship with one another. Valve portion 136 has a tapered face 138 which matches valve seat surface 128. Check valve 61 must be installed so that counterweight portion 124 pivots valve 118 to be normally open, as shown in broken lines in FIG. 4. If passage 24 is normally horizontal, then a sufficient extension of horizontal shaft 18 must be constructed so that passage 24 opens upwardly to allow check valve 61 to function properly. If the flow rate of water into passage 24 exceeds a critical rate for the design of valve 118, the force against valve portion 136 overcomes the counterweight effect of counterweight portion 124 and forces valve 118 closed, as shown in solid lines in FIG. 4. The difference in pressure on opposite sides of valve portion 136 will keep check valve 61 closed. When pressure is equalized on opposite sides of valve 118, then counterweight portion 124 will cause valve 118 to open. Pivot assembly 120 has brackets on opposite sides of passage 130 in valve 118 for the purpose of receiving and holding pin 134. Brackets 140 are set in cement 112. Housing 122 is also set in cement 112 and has a cavity 142 for receiving counterweight portion 124 when check valve 61 is open. Counterweight portion 124 should be flush with the wall surrounding check valve 61 so that water flow only influences valve portion 136 for the proper functioning of check valve 61. Shutoff valve 65 and 67 are conventional and can be identical. As indicated, the present invention advantageously combines reverse osmosis desalination technology with mining technology to achieve a substantial reduction in operational electrical costs with respect to desalinating water. As a result, the quantity of water purified is essentially limited only by the number of first and second reverse osmosis membranes which are plumbed into the system. The second brine water available from the inventive process likely has salt content sufficiently low that it can be used for human drinking water. The final product water of both filtrations will have salt content below 50 ppm and probably below 10 ppm. As a result, it is agriculturally usable. The present invention is, thus, despite its simplicity, a tremendous value to an increasingly water-short world.

Although the preferred embodiment is described in detail, it is understood that the present invention is covered by the claims and that changes in form, arrangement, and other design factors are well within the spirit of the invention and are covered to the full extent of the claims and appropriate equivalents.

What is claimed is:

1. Apparatus for desalinating salt water from a seawater source, comprising;

first, second, and third shaft means formed in the earth;

a first reverse osmosis element positioned for access in said second shaft means and being nonsubmerged relative to said salt water, said salt water being directed from said seawater source through said first shaft means to said first reverse osmosis element and having a hydrostatic pressure head created gravitationally by said salt water due to vertical height of said first shaft means, said first reverse osmosis element processing said salt water to create first permeate water and first brine water;

a first check valve which when closed prevents said salt water from flowing from said first shaft means to said first reverse osmosis element positioned in said second shaft means;

means for receiving said first brine water from said first reverse osmosis element and for compensating against said first hydrostatic pressure head and returning said first brine water to said seawater source, said first brine water receiving, compensating, and returning means including said third shaft means such that said first brine water is in fluid communication from said first reverse osmosis element through said third shaft means to said seawater source;

a second check valve, which when closed prevents said first brine water from flowing from said third shaft means to said first reverse osmosis element positioned in said second shaft means;

a second reverse osmosis element for receiving the first permeate water for processing to create second permeate water and second brine water;

first and second reservoirs; and first and second tubular means for directing said second permeate water and said second brine water from said second reverse osmosis element to said first and second reservoirs, respectfully, said second tubular means including restriction means for maintaining a second pressure head for said second brine water so that said second permeate water is obtainable.

2. The apparatus in accordance with claim 1 further having first and second reservoirs for receiving second permeate water and second brine water, respectively, said second brine water having a quality level acceptable for human drinking and said second permeate water having a lower salt content than said second brine water so as to be more acceptable for agricultural use.

3. The apparatus in accordance with claim 2 wherein said first and second reservoirs are located beneath the earth's surface, said apparatus further including first pumping-means for pumping said second permeate water to the earth's surface and second pumping means for pumping said second brine water to the earth's surface.

4. The apparatus in accordance with claim 1 wherein said second reverse osmosis element is located for processing at a lower elevational level than said first reverse osmosis element.

5. Apparatus for desalinating salt water from a seawater source, comprising:

a reverse osmosis element nonsubmerged relative to said salt water;

first and second passage means and shaft means extending downwardly from the earth's surface, said first passage means containing said salt water for gravitationally creating by vertical height a hydrostatic pressure head of a continuous flow of said salt water to said reverse osmosis element for processing to create first permeate water and first brine water and said second passage means containing said brine water received from said reverse osmosis element, said brine water in said second passage means compensating against said hydrostatic pressure before being returned to said seawater source, said shaft means being open to atmosphere and providing therethrough physical access for a human operator from the earth's surface to said reverse osmosis element located therein and also providing therethrough means for removing said permeate water from said reverse osmosis element; and first means for fluidly communicating said salt water from said first passage means to said reverse osmosis element positioned in said shall means and second means for fluidly communicating said brine water from said reverse osmosis element positioned in said shaft means to said second passage means, said first communicating means including a safety mechanism which is closeable to prevent salt water from flowing from said first passage means to said shaft means and said second communicating means including a check valve which when closed prevents brine water from flowing from said second passage means to said shaft means, said safety mechanism and said check valve protecting the shaft means from said salt water in said first passage means and from the brine water in said second passage means, said safety mechanism functioning to close when there is a rapid change of flow rate of said saltwater toward said reverse osmosis element.

6. The apparatus in accordance with claim 5 wherein said first fluidly communicating means includes a first shutoff valve and said secondly fluidly communicating means includes a second shutoff valve.

\* \* \* \* \*